United States Patent [19]

Hoshimi et al.

[11] 4,404,602
[45] Sep. 13, 1983

[54] PCM SIGNAL RECORDING SYSTEM

[75] Inventors: Susumu Hoshimi, Yokohama; Tadashi Kojima, Yokosuka, both of Japan

[73] Assignees: Sony Corporation; Tokyo Shibaura Denki Kabushiki Kaisha, both of Tokyo, Japan

[21] Appl. No.: 322,278

[22] Filed: Nov. 17, 1981

[30] Foreign Application Priority Data

Nov. 18, 1980 [JP] Japan .................................. 55-162176

[51] Int. Cl.³ .......................... G11B 27/02; G11B 5/00
[52] U.S. Cl. ......................................... 360/13; 360/32
[58] Field of Search ...................... 360/13, 14.1, 32, 51

[56] References Cited

U.S. PATENT DOCUMENTS 4,356,517 10/1982 Ozaki et al. ............................ 360/13
4,363,049 12/1982 Ohtsuki et al. ........................ 360/13

Primary Examiner—Vincent P. Canney

Attorney, Agent, or Firm—Hill, Van Santen, Steadman & Simpson

[57] ABSTRACT

A PCM (pulse code modulation) signal recording system including a first signal processor for processing a recording signal into a predetermined PCM signal, a second signal processor for processing a reproduced PCM signal into a recording signal, a first clock signal generator generating a master clock signal, a second clock signal generator generating at least one recording clock signal from the master clock signal, the recording clock signal is supplied to the first signal processor, a third clock signal generator generating at least one reproducing clock signal from the master clock signal, the reproducing clock signal is supplied to the second signal processor, a comparator digitally comparing the phases of the second and third clock signals and producing a control signal, and a controller receiving the control signal and controlling the second or third clock signal so that they are synchronized.

16 Claims, 10 Drawing Figures

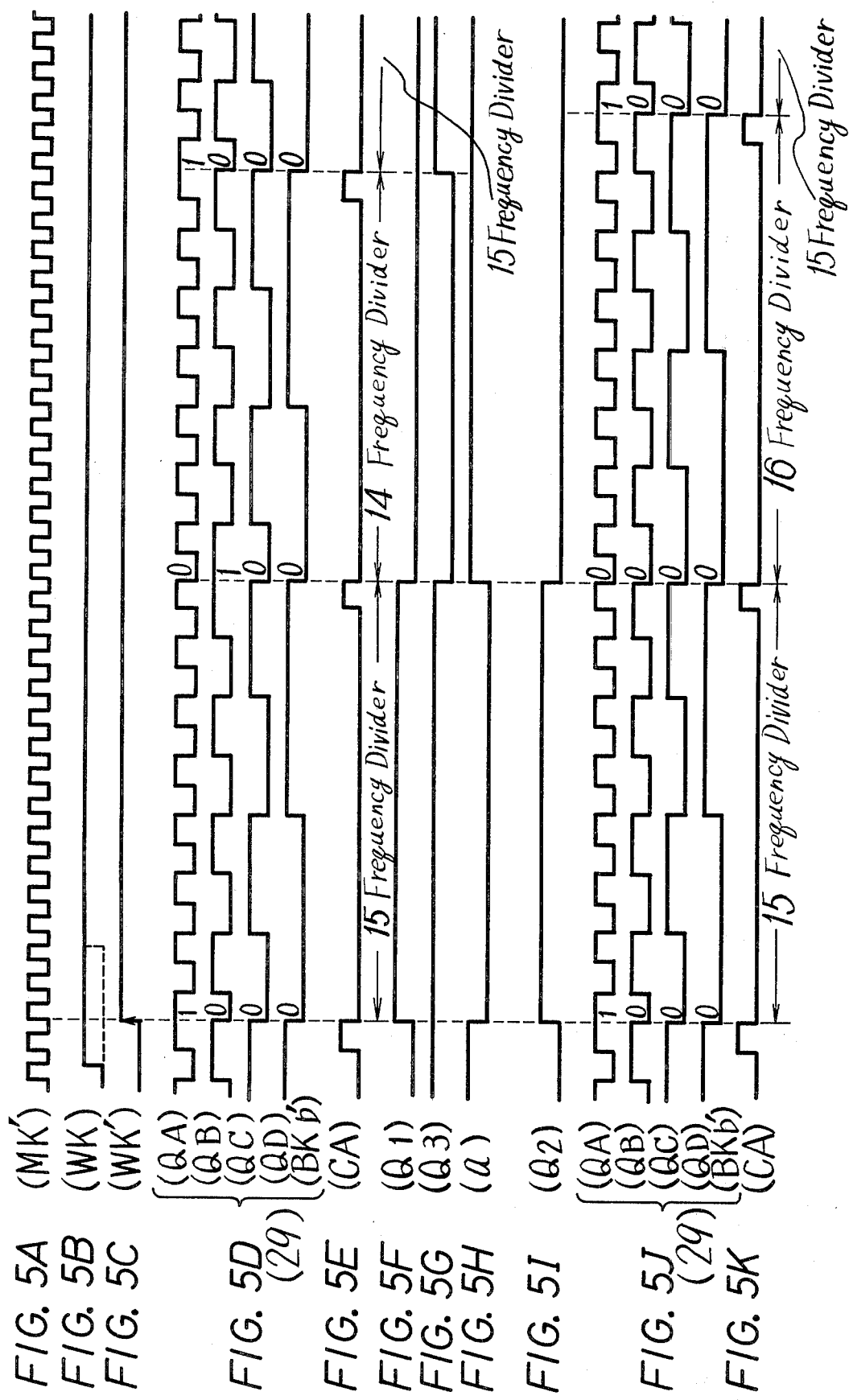

PCM SIGNAL RECORDING SYSTEM

BACKGROUND OF THE INVENTION

1. Field of the Invention

This invention relates to a PCM signal recording system and is more particularly directed to a synchronizing circuit for copying in which reproduced data is transferred to a recording means.

2. Description of the Prior Art

The use of VTRs (Video Tape Recorder) and video disks are known which use an analog signal such as an audio signal which is digitized and recorded and reproduced.

Such recording and reproducing systems are known as PCM recording and reproducing systems and have an advantage for performing high quality copying (termed dubbing) and also greatly improve the noise, and distortion characteristics as well as reduce wow and flutter. In a conventional analog system recorder there is a deterioration of the tone quality for each copying and it is difficult to accomplish high quality copying. On the other hand, PCM recording and reproducing systems allow copying which is free from such deterioration because the copying is done with a digital signal. Also, since PCM recording and reproducing systems generally include data correcting functions, the reproduced digital output to which the error correcting process has been applied can be recorded so that copying with the high quality is possible.

In such PCM recording and reproducing systems, during normal recording, a crystal oscillator is provided to produce a master clock signal which is frequency-divided to produce various clock signals which are necessary for recording. During normal reproduction, the synchronizing signal is extracted from the reproduced PCM signal and used to control a PLL (Phase Locked Loop) circuit that includes a VCO (Voltage Controlled Oscillator) which produces a master clock signal which is frequency divided so as to obtain various clock signals necessary for the reproduction process. When recording or reproducing is independently performed, even if the respective systems are operated with independent clock signals, there will be no problems.

However, when copying is to be performed with the digital signal, the systems must be synchronized since the digital data is transmitted or received between the reproducing and recording systems.

For this purpose, normally a PLL circuit has been provided in the recording system, and a word clock signal of the recording system is phase-compared with a word clock signal of the reproducing system as a reference to obtain synchronization of the recording system with the reproducing system. However, in order to perform synchronization with high accuracy, it is necessary to increase the gain of a DC amplifier to amplify the output of a low-pass filter of the PLL circuit and even microscopic noise influences the VCO which is provided in the PLL circuit and which produces the master clock signal for the reproducing system during copying, and this causes malfunctioning of the reproducing equipment.

SUMMARY OF THE INVENTION

An object of this invention is to provide a PCM signal recording system which can solve the problems of the prior art.

Another object of this invention is to provide a PCM signal recording system which is capable of performing digital copying with high accuracy.

A further object of this invention is to provide a PCM signal recording system which successfully operates in the presence of noise.

A still further object of this invention is to provide a PCM signal recording system which can be constructed as an integrated circuit.

A first signal processor is utilized for processing a recording signal and converting it into a PCM signal and a second signal processor is used for processing a reproduced PCM signal into a recording signal and a first clock signal generator generates a master clock signal and a second clock signal generator generates at least one recording clock signal from the master clock signal and the recording clock signal is supplied to the first signal processor. A third clock signal generator generates at least one reproducing clock signal from the master clock signal and the reproducing clock signal is supplied to the second signal processor. A comparator digitally compares the phases of the second and third clock signals and produces a control signal. A controller receives the control signals from the comparator and controls the second or third clock signals so that they are synchronized.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIGS. 5A through 5K comprise plots of wave forms against time at different locations in the invention.

DESCRIPTION OF THE PREFERRED EMBODIMENTS

This invention can be applied to audio PCM recording and reproducing apparatus by simply adding a PCM processor of an adapter construction to rotary head-type VTRs widely used by consumers at this time. It has been proposed in PCM adaptors to convert audio PCM data to a signal mode which is similar to a television signal and has a standard format which is illustrated in FIGS. 1A-D.

Figure 1A:
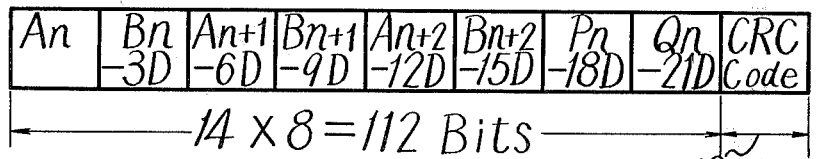
FIGS. 1A, 1B, 1C, 1D and 1E are plots for illustrating the signal formats in a PCM signal recording system.
Figure 1B:
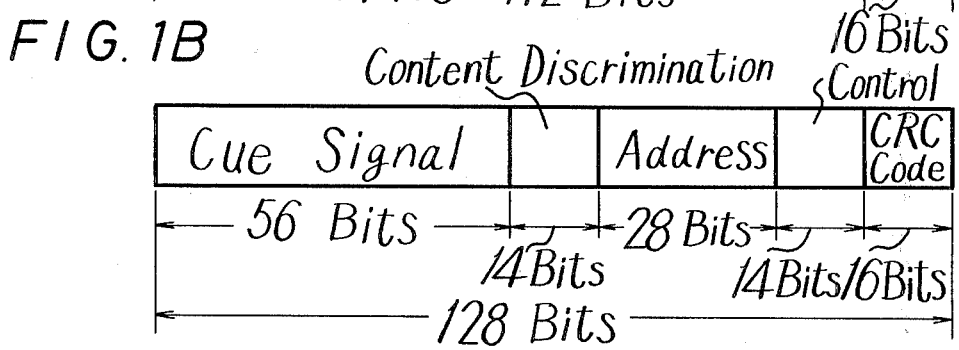

FIG. 1A shows a data block which is to be inserted into one horizontal interval (1H) and FIG. 1B illustrates a control block which is to be inserted into a first 1H interval of each vertical interval (1V). Audio signals of 2 channels are respectively sampled at a sampling frequency $f_s = 44.056$ KHz and converted to data words $A_i$ and $B_i$ having 14 bits each. One data block includes six data words of 14 bits each, two check words $P_I$ and $Q_I$ of 14 bits each for error correction and a CRC code word of 16 bits for detecting the presence or absence of errors in the data having a total of 8 words. The length of one block thus is 128 bits. The check words $P_i$ and $Q_i$ for error correction are formed from the data format of 6 words and the resulting 8 data words are interleaved word by word. In FIG. 1A, suffixes associated each word shows the interleaving relationship where a unit delay amount is represented by D block. The control block illustrated in FIG. 1B comprises a Cue signal of 56 bits, then a content discriminating signal of 14 bits, then an address signal of 28 bits, then a control signal of 14 bits and at last a CRC code of 16 bits for error-detection of the prior signals.

Figure 1C:
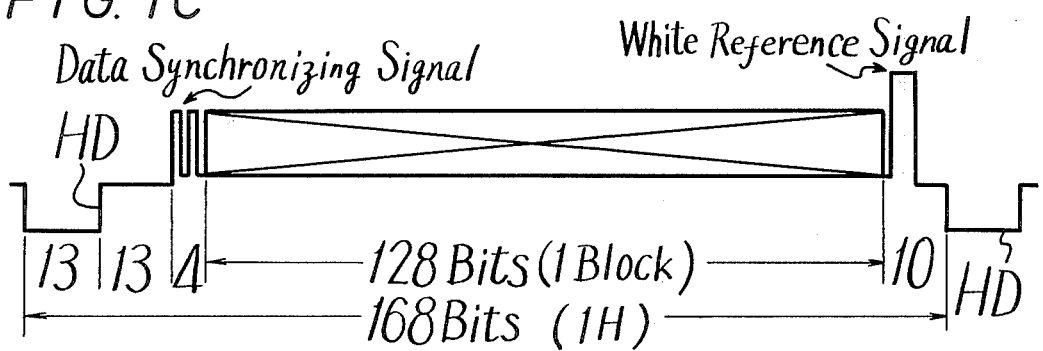
Figure 1D:
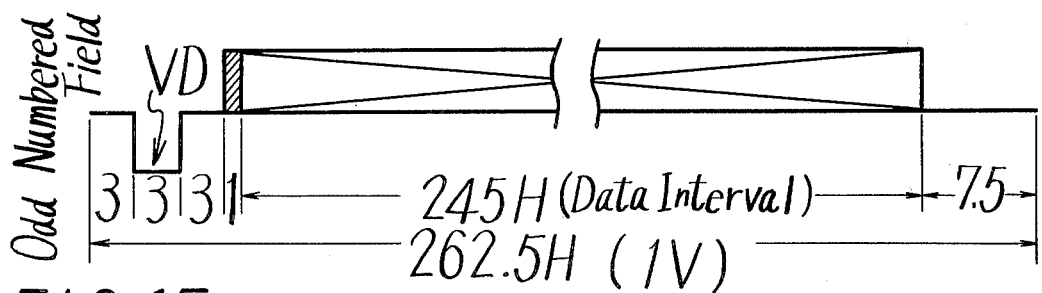
Figure 1E:
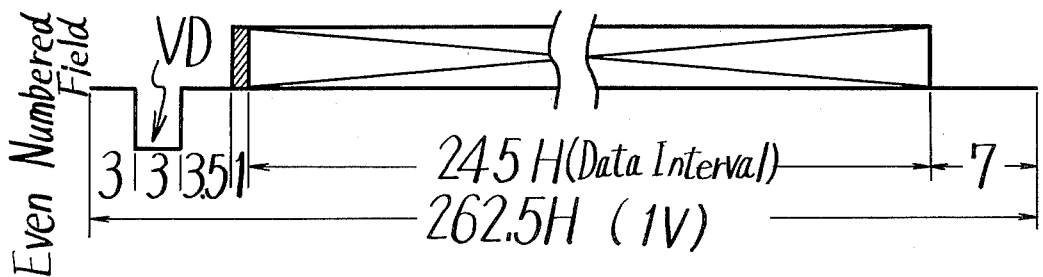

As shown in FIG. 1C, into a 1H (168 bits) interval specified by a horizontal synchronizing signal HD there is inserted one block of 128 bits and a data synchronizing signal is added to the front and a white reference signal is added to the rear. As shown in FIG. 1D, a data interval is selected as 245H within one field (1 V) and plus there are a total of 9H of (9.5H for an even-numbered field) equalizing pulse intervals as well as a vertical synchronizing signal (VD) interval and an interval of 7.5H (7H for an even-numbered field) and including a head switching timing and as shown by the cross-hatched section, the control block is inserted into the first 1H interval.

Figure 2:
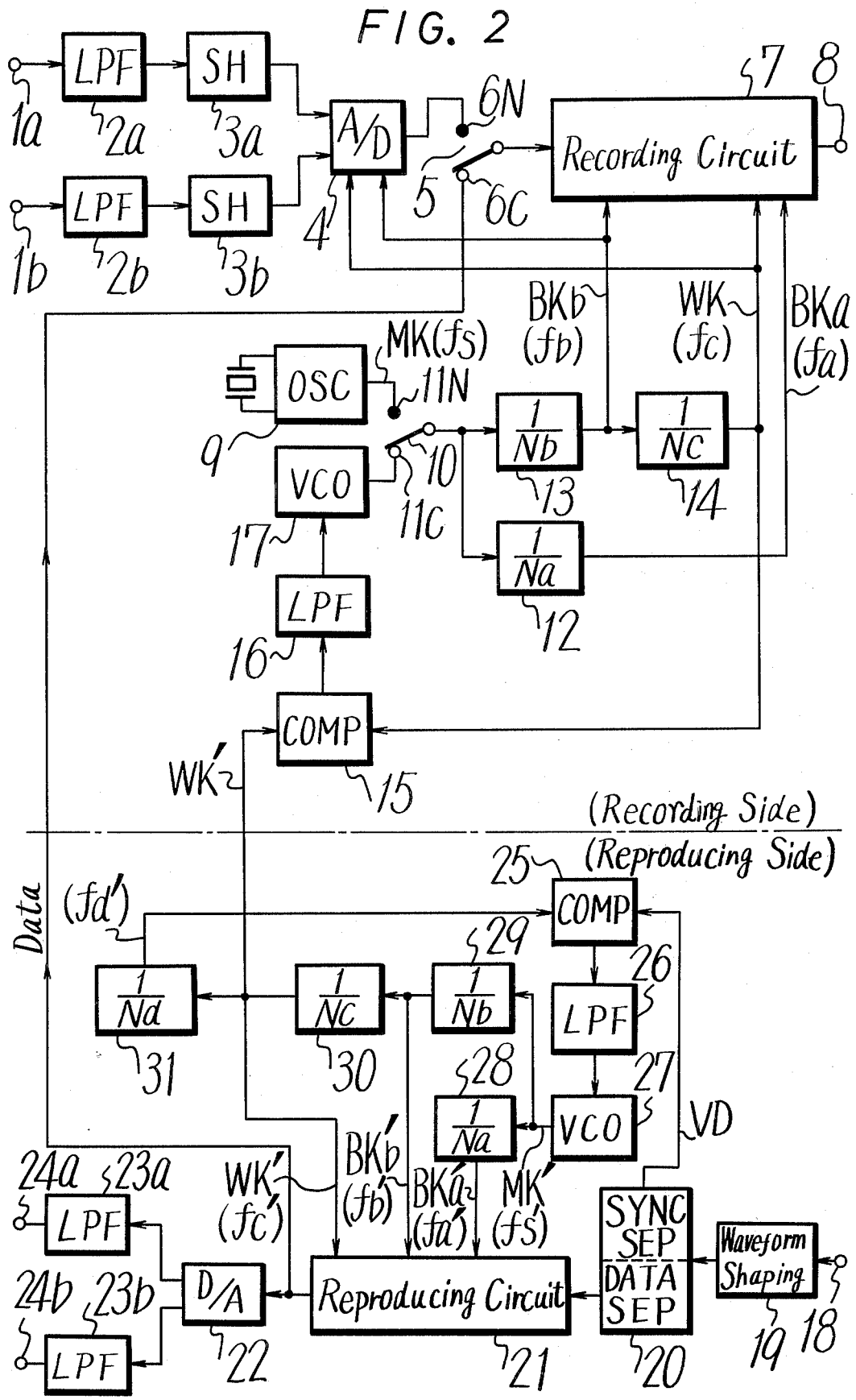
FIG. 2 is a block diagram for explaining and illustrating the PCM signal recording system according to the invention.

FIG. 2 illustrates the PCM adaptor mentioned above and illustrates constructions of recording and reproducing clock signal generator portions. During recording, the audio signal of the 2 channels received at input terminals 1a and 1b in FIG. 2 is bandwidth limited by low-pass filters 2a and 2b and sampled by sample and hold circuits 3a and 3b at a selected frequency. The sampled output is supplied to an A/D converter 4 in which one sample of each channel is converted to a PCM data signal of 14 bits. The PCM data signal supplied from the A/D converter 4 is applied through side terminal 6N of a switch 5 to a recording circuit 7 so that at the video output terminal 8 a video signal of the format as shown in FIG. 1 will exist. From terminal 8 it is supplied to a video input terminal of the VTR and recording on a recording medium such as magnetic tape. The recording circuit 7 includes an error-correction encoder, a memory for interleaving, a time-base compression circuit, and a CRCC addition circuit.

During normal recording, a master clock signal MK at a frequency $f_s$ is generated by a crystal oscillator 9 and is supplied, through a terminal 11N of a switch 10 to counters 12 and 13. The counter 12 produces a bit clock signal BKa having a frequency $f_a$ which is a 1/Na frequency-divided output of frequency $f_s$. The counter 13 generates a bit clock signal BKb having a frequency $f_b$ which is a 1/Nb frequency-divided output of the frequency $f_s$. The output of the counter 13 is further frequency-divided by a counter 14 in which a two words clock signal WK having a frequency $f_c$ which is one-half the frequency of the work clock signal is produced.

The bit clock signal BKa is used as the bit clock signal for the read portion of the recording circuit 7 and the bit clock signal BKb having a frequency $f_b$ ($<f_a$) is used as the bit clock signal for the write portion of the recording circuit 7. An A/D converter 4 receives the bit clock signal BKb and the two words clock signal WK.

During reproduction, the video input terminal 18 of the PCM adaptor receives a reproduced signal which has been reproduced from tape in the VTR and which is produced at the video output terminal. The signal is supplied from terminal 18 through a waveform shaping circuit 19 to a data and synchronizing signal separator circuit 20. The data separated in circuit 20 is provided to a reproducing circuit 21 and the separated vertical synchronizing signal VD is supplied to a phase comparator 25. The reproducing circuit 21 includes a CRCC checker circuit, a memory for time-base extension and de-interleaving and an error-correction decoder. The output data of the reproducing circuit 21 is applied to a D/A converter 22 in which analog outputs for each channel are produced which are supplied through low-pass filters 23a and 23b to output terminals 24a and 24b.

The clock signal generator for the reproducing equipment includes the PLL circuit for a VCO 27 which receives as a controlling voltage the output of the phase comparator 25 which is supplied through a low-pass filter 26 to VCO27. Counters 28, 29, 30 and 31 are connected as shown. The VCO 27 produces a reproduced side master clock signal MK' with a frequency $f_s'$ and the counter 28 frequency-divides this master clock signal by multiplying it by 1/Na thereby generates a bit clock signal BKa' at a frequency $f_a'$. The counter 29 frequency-divides this master clock signal by multiplying it by 1/Nb to produce a bit clock signal BKb' at a frequency $f_b'$.

The bit clock signal BKb' is frequency-divided by multiplying it by 1/Nc in the counter 30 thereby forming two words clock signal WK' at a frequency $f_0'$. The counter 31 frequency-divides the WK' by multiplying it by 1/Nd so as to form a signal at a field frequency $f_d'$ which is applied to the phase comparator 25. In the PLL arrangement thus described, it is possible to produce each clock signal so that they will be synchronized with the reproducing signal. The bit clock signal BKa' is employed as the write portion bit clock signal for the reproducing circuit 21, and the bit clock signal BKb' having a frequency $f_b'$ ($<f_a'$) is employed as the read portion bit clock signal for the reproducing circuit 21.

When dubbing is to be performing in a stage where the signal is digital by utilizing the PCM adaptor described above, a first VTR will be used to reproduce a magnetic tape on which a signal has already been recorded and a second VTR will be used to record again the above-described signal on another magnetic tape for dubbing. Of course, in place of the first VTR, a video disk player which can reproduce a video disk and which can only perform reproduction may be utilized. During copying, the switches 5 and 10 provided on the recording portion of the PCM processor are moved to engage copy mode terminals 6C and 11C and the reproduced output of one VTR is supplied from the video input terminal 18 of the reproducing mode of the PCM processor. Data which comprises serial bits which has been corrected for error and which is derived from the reproducing circuit 21 is supplied through the switch 5 to the recording circuit 7 and the video signal appearing at the output terminal 8 is recorded by the other VTR. Accordingly, the clock signal to perform the data processing in the recording circuit 7 must be synchronized with the data fed from the reproducing circuit 21.

The circuit illustrated in FIG. 2 is arranged in a manner such that by separating or detaching the crystal oscillator 9 by moving the switch 10 from ON to OFF and using the analog PLL circuit comprising the phase comparator 15, the low-pass filter 16, the VCO 17 and the counters 13 and 14, allows the two words clock signals WK' and WK of the reproducing and recording portions to be phase-compared and the VCO 17 will produce the master clock signal in synchronism with the data transferred.

However, during copying, since the data is transmitted and received as serial bits, the clock signal of the recording and reproducing portions must be synchronized with a high accuracy. To accomplish this, the gain of the DC amplifier for amplifying the output of the low-pass filter must be increased. The result is that even microscopic noise is apt to be amplified and the VCO 17 is influenced by such noise which easily causes malfunctions such as causing the phase to become unlocked. If phase unlock occurs, the data cannot be correctly transferred and the copied magnetic tape will be reproduced so as to generate abnormal sounds. Further, the low-pass filter 16 and the VCO 17 and other components will not be suitable for use with integrated circuits since other capacitors are required which cannot be incorporated into the integrated circuit.

Figure 3:
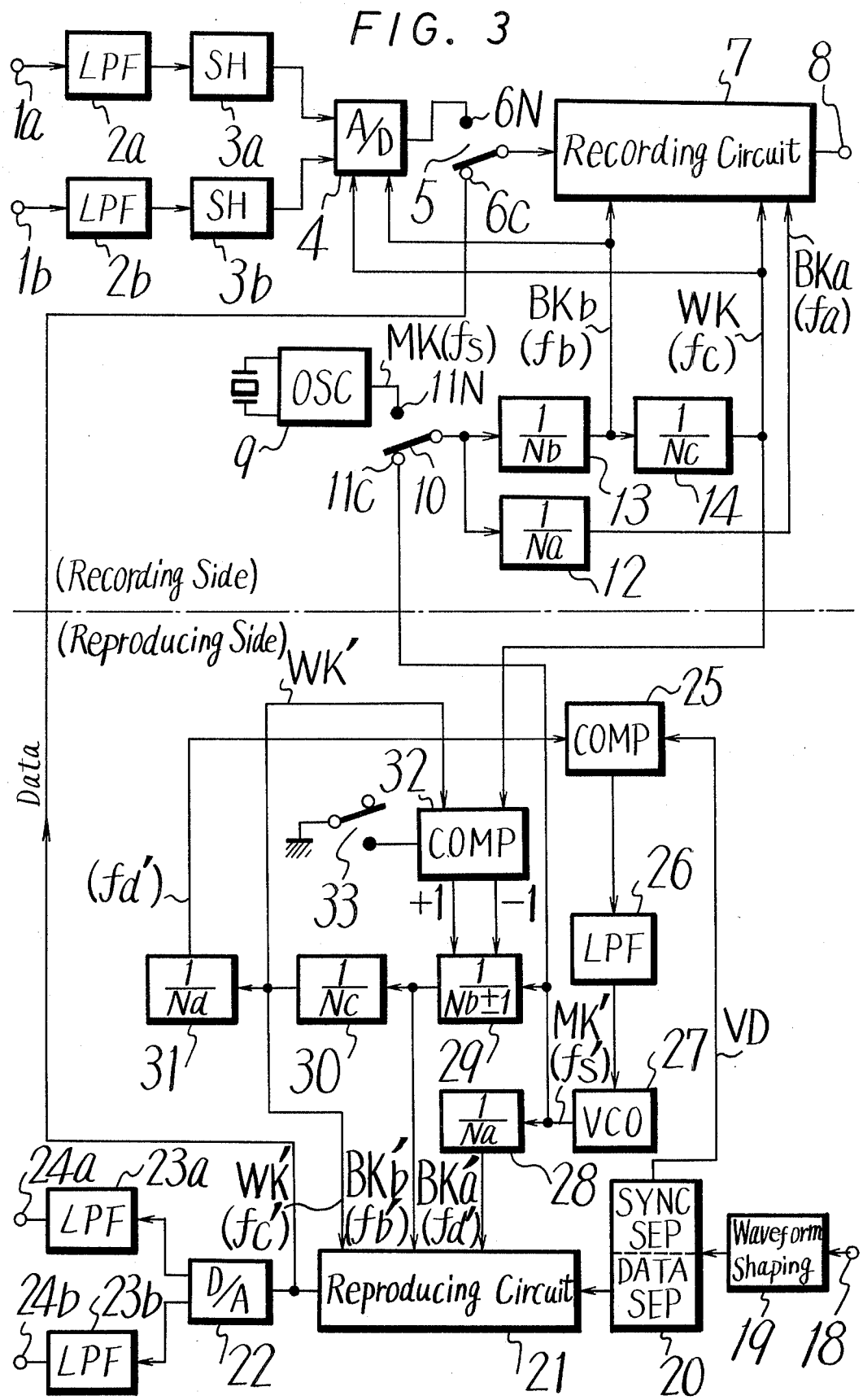
FIG. 3 is a block diagram illustrating a first embodiment of the invention.

FIG. 3 shows one embodiment of this invention in which a circuitry arrangement in during normal operation is the same as that illustrated in FIG. 2 and the recording and reproducing operations are performed independently as in the embodiment of FIG. 2. During copying the switch 5 is moved so that the data from the reproducing circuit 21 is supplied through the copy made terminal 6C to the recording circuit 7, and the master clock signal MK' produced by the VCO 27 on the reproducing side is applied through the copy mode terminal 11C of switch 10 to the counters 12 and 13. In the embodiment of this invention, the counter 29 is selected to be a programmable counter and a digital phase comparator 32 is also provided. The compared output changes the frequency dividing ratio of the counter 29 to three ratios $1/(Nb+1)$, $1/Nb$ and $1/(Nb-1)$. A switch 33 is provided for the phase comparator 32 so that only during copying will the phase comparator 32 produces a control output to change the frequency dividing ratio of the counter 29 and in other modes, the control output is not produced by the frequency dividing ratio of the counter 29 is fixed at $1/Nb$. The phase comparator 32 receives a two word clock signal WK' of the reproducing side produced by the counter 30 and a two word clock signal WK from the recording side generated by the counter 14. The phase difference produces a control signal output to change the frequency dividing ratio of the counter 29. If the frequency $f_b'$ of the bit clock signal BKb' when the frequency dividing ratio of the counter 29 is $1/Nb$ is taken as a reference, the ratio of $1/(Nb+1)$ lowers the frequency and the ratio of $1/(Nb-1)$ raises the frequency. The one embodiment of this invention shown in FIG. 3 illustrates a circuit in which the recording signal is taken as the reference and controls the phases of two words clock signal WK' of the reproducing side and the bit clock signal BKb' of the read side.

It is also possible for the programmable counter 29 and the digital phase comparator 32 to be provided on the recording side so as to control the frequency dividing ratio of the counter 29 on the recording side. When the phase comparator 32 is provided on the reproducing side, however, as seen in one embodiment of this invention, the following advantage results. First, when an audio PCM signal from other apparatus and the reproduced data are mixed for recording it is preferable that the frequency dividing ratio of the counter for generating the recording side clock signal be constant since the recording side is generally treated as of primary importance. Second, when the output data of the A/D converter 4 and the reproduced data are mixed, jitter occurring during each clock signal on the recording side can be reduced.

Figure 4:
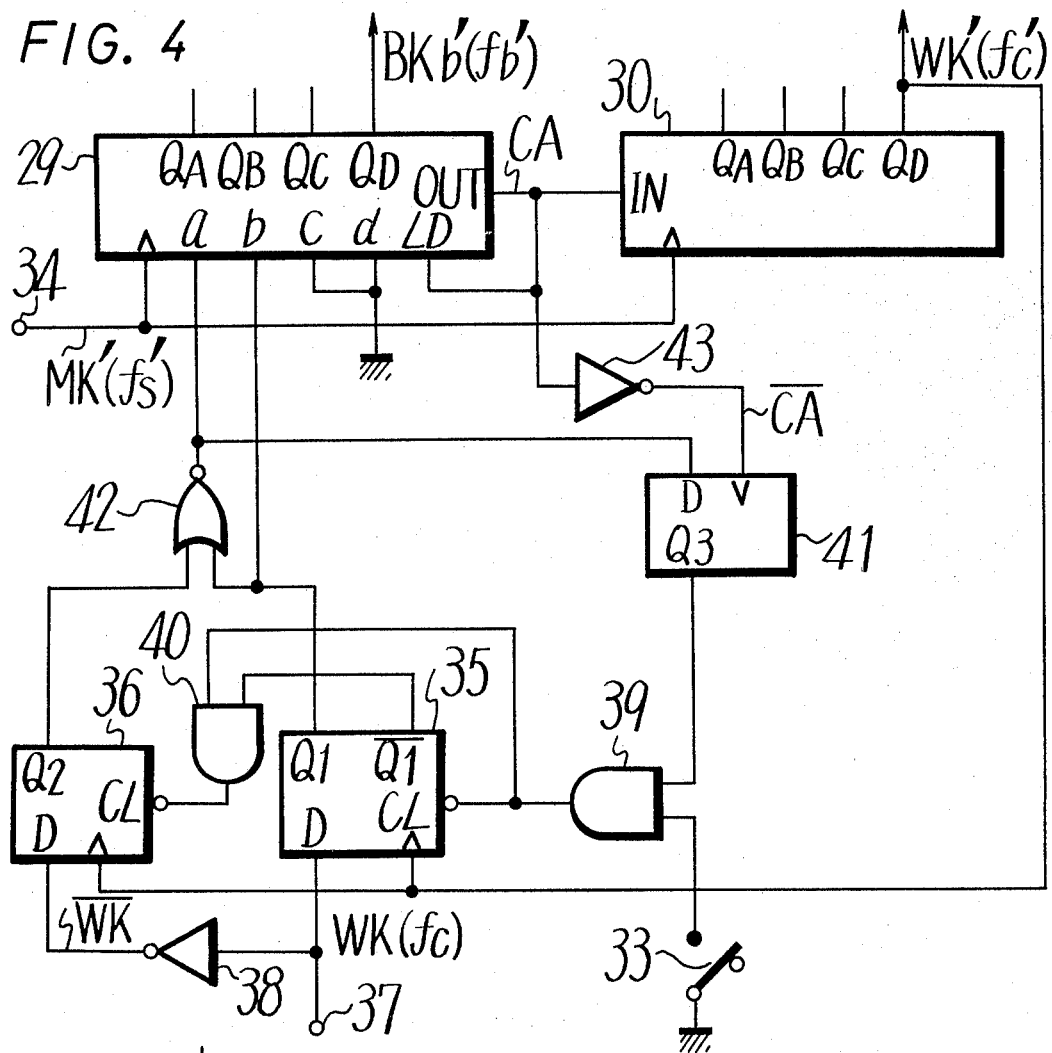
FIG. 4 is a block diagram illustrating a digital phase comparator of one embodiment of the invention.

An explanation will be given for one specific embodiment of a synchronizing circuit according to the digital phase comparator 32 of one embodiment of this invention shown on reference to FIGS. 4 and 5.

In this embodiment, the counter 29 is formed of a synchronizing presettable binary counter of 4 bits and the counter 30 is formed of a synchronized binary counter of 4 bits. The clock signal inputs of the counters 29 and 30 are received from the master clock signal MK' of the reproducing side which is supplied from a terminal 34 and a carry output CA of the counter 29 is supplied to the counter 30 thereby producing the bit clock signal BKb' at an output terminal $Q_D$ of the counter 29 and the two words clock signal WK' at an output terminal $Q_D$ of the counter 30. In this embodiment, Nb=15 and Nc=16 are established and the frequency dividing ratio of the counter 29 is varied by a preset input at terminals (abcd) to the counter 29. If the preset input (abcd) is (0000), Nb=16 is established, if (1000), Nb=15, and if (0100), Nb=14. The carry output CA of the counter 29 is applied to a load terminal LD so as to load a predetermined preset input. For clock signal inputs for each of the D-flip-flops 35 and 36 there is supplied the two words clock signal WK' appearing at the output terminal $Q_D$ of the counter 30. For a data input of the flip-flop 35 there is supplied the two words clock signal WK of the recording side from a terminal 37, and for a data input for the flip-flop 36 there is applied the two words clock signal $\overline{WK}$ inverted by an invertor 38. To clear terminals CL of the flip-flops 35 and 36 there are supplied the outputs of AND gates 39 and 40. When the outputs of the AND gates 39 and 40 are "1" (high level), the flip-flops 35 and 36 are made operative and when these outputs are "0" (low level), the flip-flops 35 and 36 are cleared.

To the AND gate 39 is supplied a signal which can be changed to "1" by a switch 33 during copying and an output of an output terminal $Q_3$ of a D-flip-flop 41. To the AND gate 40 are supplied an output of the AND gate 39 and an output derived from an output terminal $\overline{Q_1}$ of the flip-flop 35. Outputs derived from output terminals $Q_1$ and $Q_2$ of the flip-flops 35 and 36 are supplied to a NOR gate 42. For the preset input a of the counter 29 there is applied an output of the NOR gate 42 and for the preset input b, there is applied the output from the output terminal $Q_1$ of the flip-flop 35. The output of the NOR gate 42 is input to the flip-flop 41 as a data input and a clock signal input is supplied from inverter 43 as a carry output $\overline{CA}$.

When the two words clock signal WK' is after in phase the two words clock signal WK, a detection output "1" appears at the output terminal $Q_1$ of the flip-flop 35. On the contrary, when the phase of the WK' is ahead in phase of the two words clock signal WK, the detection output of "1" appears at the output terminal $Q_2$ of the flip-flop 36. Also, the counter 30 frequency-divides the carry output CA of the counter 29 by 1/16 thereby producing the two words clock signal WK'. A control to change the frequency-dividing ratio of the counter 29 is performed once in each period of the two words clock signal WK', which is accomplished by the flip-flop 41. That is, when the output of the output terminal $Q_3$ of the flip-flop 41 during copying is "1", the flip-flops 35 or 36 compare the phase of the signals.

Referring to FIG. 5, FIG. 5A shows the master clock signal MK'. In the normal mode, the output of the AND gate 39 is "0" and the flip-flops 35 and 36 are cleared. Thus, the output of the NOR gate 42 is always "1". Accordingly, the preset inputs (abcd) of the counter 29 are always expressed as (1000). Since the counter 29 is formed of the synchronizing presettable counter, when all output terminals $Q_A$ to $Q_D$ are made "1", the carry output CA becomes "1" thereby loading the preset input as the next master clock signal MK'. The frequency dividing ratio of the counter 29 in the normal mode will be 1/15. Also, the output at the output terminal $Q_3$ of the flip-flop 41 is "1".

If the switch 33 is moved to the copy side, the output of the AND gate 39 becomes "1" and the output of the AND gate 40 becomes "1" thereby placing the flip-flops 35 and 36 into the operation mode. By way of example, as shown in FIGS. 5B and 5C when the two words clock signal WK' is after in phase the two words clock signal WK, the WK will be sampled at a rising edge of the WK' and as shown in FIG. 5F, the output at the output terminal $Q_1$ of the flip-flop 35 becomes "1". Accordingly, the preset input "a" produced at the output of the NOR gate 42 becomes "0" as illustrated in FIG. 5H. Outputs as shown in FIG. 5D are produced at the output terminals $Q_A$ through $Q_D$ of the counter 29 and the output of the output terminal $Q_D$ is taken as bit clock signal BKb'. When the output of the NOR gate 42 becomes "0", the preset input of the counter 29 is (0100). Thereafter, the carry output CA becomes "1" and the preset input is loaded at the next master clock signal MK' thereby producing an output coincident with this preset input at the output terminals $Q_A$ to $Q_D$ of the counter 29. Further, since the output ("0") of the NOR gate 42 is set in the flip-flop 41 by the falling edge of the carry output CA, the output at the output terminal $Q_3$ thereof becomes "0" as seen in FIG. 5G whereby the output of the AND gate 39 becomes "0" and the flip-flops 35 and 36 are cleared. Hence, the output (FIG. 5F) at the output terminal $Q_1$ of the flip-flop 35 becomes "0" and the output (FIG. 5H) of the NOR gate 42 becomes "1". As described above, the preset input of the (0100) is loaded so that the counter 29 frequency-divides the clock signal be 1/14 one time and the next carry output CA loads the preset input of the (1000) so that the counter 29 is converted to a mode to frequency divide the clock signal by 1/15. $14+(15\times15)=239$ clocks of the master clock signal MK' which completes one cycle operation and the phase of the two words clock signal WK' is advanced by one clock signal of the master clock signal MK'.

As shown by a broken line in FIG. 5B, if the clock WK' is ahead in phase of the two words clock signal WK, the clock $\overline{WK}$ (="1") is sampled at the rising edge of the clock $\overline{WK}$, and the output at the output terminal $Q_2$ of the flip-flop 36 becomes "1" as shown in FIG. 5I. Accordingly, the output of the NOR gate 42 becomes "0". Further, since the clock WK is made "0" at the rising edge of the clock WK', the output at the output terminal $Q_1$ of the flip-flop 35 is made "0". For this reason, the preset input (abcd) is (0000) and is loaded in synchronism with the master clock signal MK' and then the carry output CA becomes "1". Therefore, the counter 29 frequency-divides the clock signal by 1/16 and when the output at the output terminal $Q_3$ of the flip-flop 41 becomes "0", the counter 29 is switched to the mode to frequency-divide the clock signal by 1/15. $16+(15\times15)=241$ clocks of the master clock signal MK' completes one cycle operation and the two words clock signal WK' will be behind in phase the master clock MK' by one clock signal.

As described above, until the two words clock signal MK' on the reproducing side are synchronized with the two words clock signal WK on the recording side, the counter 29 continues to control the frequency-dividing ratio. In addition, although the bit clock signal BKb' taken from the output terminal $Q_D$ of the counter 29 contains jitter of $\pm 1/15$ [%] this will be only when the frequency-dividing ratio Nb is altered and the amount is too small to cause problems in the data processing in the reproducing circuit 21.

Figure 6:
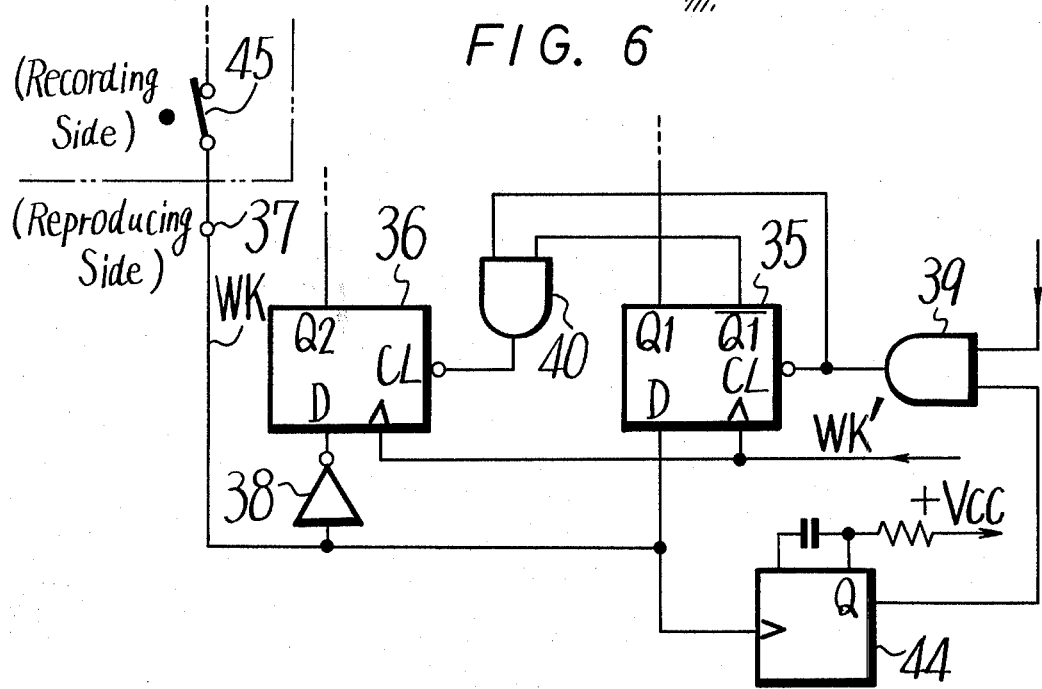
FIG. 6 is a block diagram of a second embodiment of a digital phase comparator.

Also, in one embodiment of this invention as set forth above, there is provided the switch 33 in order to operate the digital phase comparator 32 only during copying. FIG. 6 shows an example of arranged circuitry in which switch 33 is omitted. In FIG. 6, numeral 44 designates a triggerable monostable multivibrator which is supplied with the two words clock signal WK from a clock input terminal thereof and having a delay time of one period of the clock WK and through 45 a switch which is provided on the recording side and supplies the word clock signal WK to the terminal 37 of the reproducing side only during copying. The monostable multivibrator 44, during copying when supplied with the two words clock signal WK through the switch 45, produces an output of "1" at an output thereof which is supplied to the AND gate 39. Arrangements of other portions of the circuit in FIG. 6 are not shown but are similar to those of FIG. 4. As depicted above, in the construction in which the switch 33 is omitted, it is possible to reduce the number of terminals by one where the phase comparator 32 is formed of a LSI (Large-Scale Integration).

As is understood from the explanation of one embodiment mentioned above, in accordance with this invention, since each clock signal synchronized with the reproduced data on the recording side is not formed by the analog PLL circuit including the VCO 17 similar to the known arrangement as shown in FIG. 2 the possibility that the phase lock will be unlocked by noise or the like can be reduced and digital copying with high quality is possible. In other words, in an initial condition where a switch of a voltage supply in turned ON or a mode is converted from "normal" to "copy", it is possible to compensate for phase deviation which will be caused by the fact that states that the counters of the recording and reproducing sides are not specified. In addition, when phase deviation will be caused by the noise or the like in the course of copying, such phase deviation can be compensated and synchronization with high accuracy can be realized. Also, since a digital phase comparator is employed, this invention has an advantage that the system can easily be constructed in integrated circuit techniques.

Although the invention has been described with respect to preferred embodiments, it is not to be so limited as changes and modifications can be made which are within the full intended scope of the invention as defined by the appended claims.

We claim as our invention:

1. A PCM signal recording system comprising, first signal processing means for processing a recording signal into a predetermined PCM signal, second signal processing means for processing a reproduced PCM signal into said recording signal, first clock signal generating means for generating a master clock signal, second clock signal generating means for generating at least one recording clock signal from said master clock, said recording clock signal being supplied to said first signal processing means, third clock signal generating means for generating at least one reproducing clock signal related to said master clock, said reproducing clock signal being supplied to said second signal processing means, comparing means for digitally comparing the phases of said second clock signal and said third clock signal and for producing a control signal, and control means for controlling said second or third clock signal so that they are synchronized with each other receiving said control signal.

2. A PCM signal recording system according to claim 1, wherein said control means is provided in said third clock signal generating means.

3. A PCM signal recording system according to claim 2, wherein said third clock signal generating means includes a programmable divider for dividing said master clock signal and the dividing ratio can be increased or decreased by the control signal.

4. A PCM signal recording system according to claim 1, further comprising detecting means for detecting whether said second or said third clock signal is supplied to said comparing means and connected for controlling said comparing means so that it is operative only when said second or third clock signal is supplied to said comparing means.

5. A PCM signal recording and reproducing circuit comprising a recording circuit, a master oscillator, first frequency dividing means supplying an output to said recording circuit, first switch means for selectively connecting the output of said master oscillator to said first frequency dividing circuit, a reproducing circuit adapted to receive a reproduced video signal and process it, a frequency variable oscillator supplying an input to said reproducing circuit, a data separation circuit receiving said reproduced video signal and supplying an input to said reproducing circuit, second controllable frequency dividing means receiving an output of said frequency variable oscillator and supplying an input to said reproducing circuit, a first comparator means receiving inputs from said data separation circuit and said second controllable frequency dividing means and supplying an input to said frequency variable oscillator to control its output frequency, the output of said frequency variable oscillator supplied through said first switch means to said first frequency dividing means, a second comparator means receiving inputs from said first dividing means and said second controllable frequency dividing means and supplying an input to said second controllable frequency dividing means to control its dividing ratio.

6. A PCM signal recording and reproducing circuit according to claim 5 wherein said frequency variable oscillator is a voltage controllable oscillator.

7. A PCM signal recording and reproducing circuit according to claim 6 including a low pass filter connected between said first comparator means and said voltage controllable oscillator.

8. A PCM recording and reproducing circuit according to claim 5 wherein said first frequency dividing means includes a plurality of dividing stages.

9. A PCM recording and reproducing circuit according to claim 5 wherein said second controllable frequency dividing means includes at least one dividing stage which has a fixed dividing ratio and at least one dividing stage which has a controllable dividing ratio.

10. A PCM recording ad reproducing circuit according to claim 9 wherein said one dividing stage which has a fixed dividing ratio is a digital counter.

11. A PCM recording and reproducing circuit according to claim 9 wherein said dividing stage with a controllable dividing ratio is a digital counter.

12. A PCM circuit according to claim 11 including at least two digital control terminals on said digital counter which has a controllable dividing ratio and said second comparison means produces at least two digital output signals which are connected to said two digital control terminals.

13. A PCM circuit according to claim 12 wherein said second comparison circuit comprises at least two flip-flop circuits.

14. A PCM circuit according to claim 13 wherein a second switch means is connected to one of said two flip-flop circuits.

15. A PCM circuit according to claim 13 including a triggerable monostable circuit connected to one of said two flip-flop circuits.

16. A PCM circuit according to claim 13 including a third flip-flop circuit in said second comparison circuit.

* * * * *